United States Patent [19]

Lew et al.

[11] Patent Number: 4,512,372
[45] Date of Patent: Apr. 23, 1985

[54] FLOATING DISC DIVERT VALVE

[76] Inventors: Hyok S. Lew; Yon S. Lew, both of 7890 Oak St., Arvada, Colo. 80005

[21] Appl. No.: 395,834

[22] Filed: Jan. 6, 1982

[51] Int. Cl.³ .............................................. F16K 11/16
[52] U.S. Cl. .................... 137/862; 137/876; 137/887; 251/162
[58] Field of Search ...................... 137/862, 876, 887; 251/162

[56] References Cited

U.S. PATENT DOCUMENTS 4,295,491 10/1981 Galloway ............................. 137/876
4,322,056 3/1982 Lew et al. ......................... 251/306 X Primary Examiner—Gerald A. Michalsky

[57] ABSTRACT

This invention relates to a divert valve comprising a pair of disc valves operated by a common actuator wherein the tolerance in the mating between the valve seat and the disc in one disc valve disposed in the first bifurcating pipe is controlled independent of the other disc valve disposed in the second bifurcating pipe branching out from the first bifurcating pipe.

1 Claim, 5 Drawing Figures

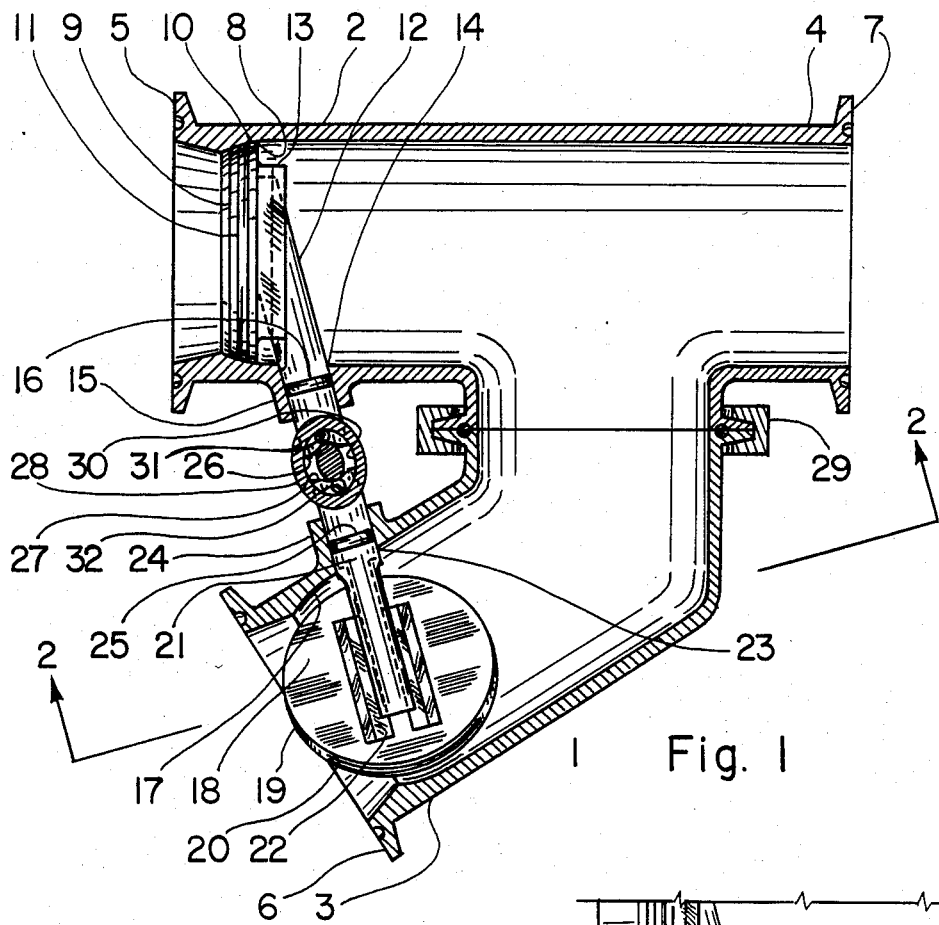
Fig. 1
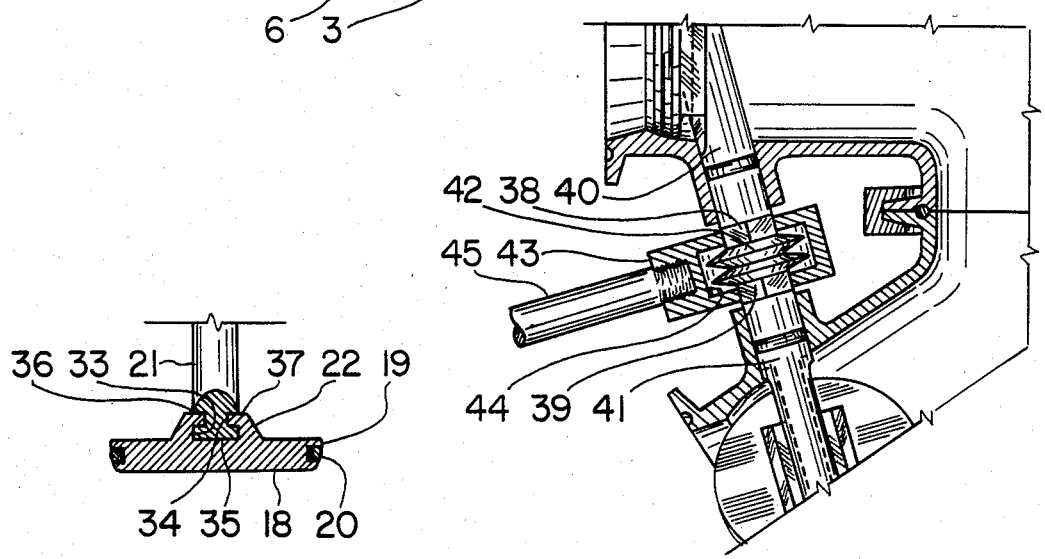
Fig. 2
Fig. 3

1

FLOATING DISC DIVERT VALVE

The divert valves widely used by the present day processing industries are either the multi-way ball valves or the shuttling block valves, which are not suitable for the sanitary application because of the deep crevices included in such divert valves that traps and stores the contaminants. There is a divert valve employing a pair of discs designed into reasonably clean configuration (U.S. Pat. No. 4,295,491, Galloway). However, said divert valve employing a pair of discs has a very serious fault in the arrangement that makes the manufacturing and operation of Galloway's divert valve extremely difficult when one hundred percent closure is required, which task becomes absolutely impossible when the operating fluid pressure is reasonably high. The Galloway valve employs a single long cantilever type valve stem to which both discs are rigidly connected. As a consequence, the tolerance between the mating parts for two separate discs have to be controlled to the required value simultaneously in the manufacturing as well as in the operation, which task is a very difficult one in view of the lack of rigidity of the valve stem supporting two disc and the lack of rigidity in the bifurcating valve body assembly that supports two valve seats.

The primary object of the present invention is to provide the divert valves employing a pair of combinations of the disc and valve seat wherein the tolerance in the mating condition between the valve seat and disc is independently controlled while said pair of the disc valves included in the divert valve is operated by a single actuator.

Another object of the present invention is to provide the divert valves employing a pair of discs supported by two independent valve stems lined up to one another, each of said two independent valve stems extending from each of said two discs in an oblique angle and extending through the valve body to the outside of the valve body.

A further object of the present invention is to provide the divert valves employing the spherical valve seats.

Yet another object of the present invention is to provide the divert valves including two independent stems flexibly coupled to one another and spring biased to one another to provide a seating pressure even when there is no fluid pressure in said divert valve.

Yet a further object of the present invention is to provide the divert valves wherein the seating pressure between the valve seat and the disc can be established for a leak-proof shut-off and relieved for a frictionless rotation of the discs by an external means.

Still another object of the present invention is to provide the divert valves wherein the discs are mechanically connected to the valve stems in the sliding relationship.

Still a further object of the present invention is to provide the divert valves wherein the discs automatically adapt themselves to the valve seats.

Additionally another object of the present invention is to provide the divert valves that shuts off one hundred percent even under a high fluid pressure.

Additionally a further object of the present invention is to provide the divert valves which are easy to manufacture and maintain.

These and other objects of the present invention will become clear as the description thereof proceeds. The present invention may be described with a great clarity and specificity by referring to the following Figures:

FIG. 1 illustrates a cross section of the floating disc divert valve constructed in accordance with the principles of the present invention.

FIG. 2 shows a cross section of the mechanical connection between the disc and the valve stem, which cross section is taken along a plane 2—2 as shown in FIG. 1.

FIG. 3 illustrates the coupling with a spring bias that connects two valve stems included in a divert valve for the operation by a single actuator.

Figure 4:
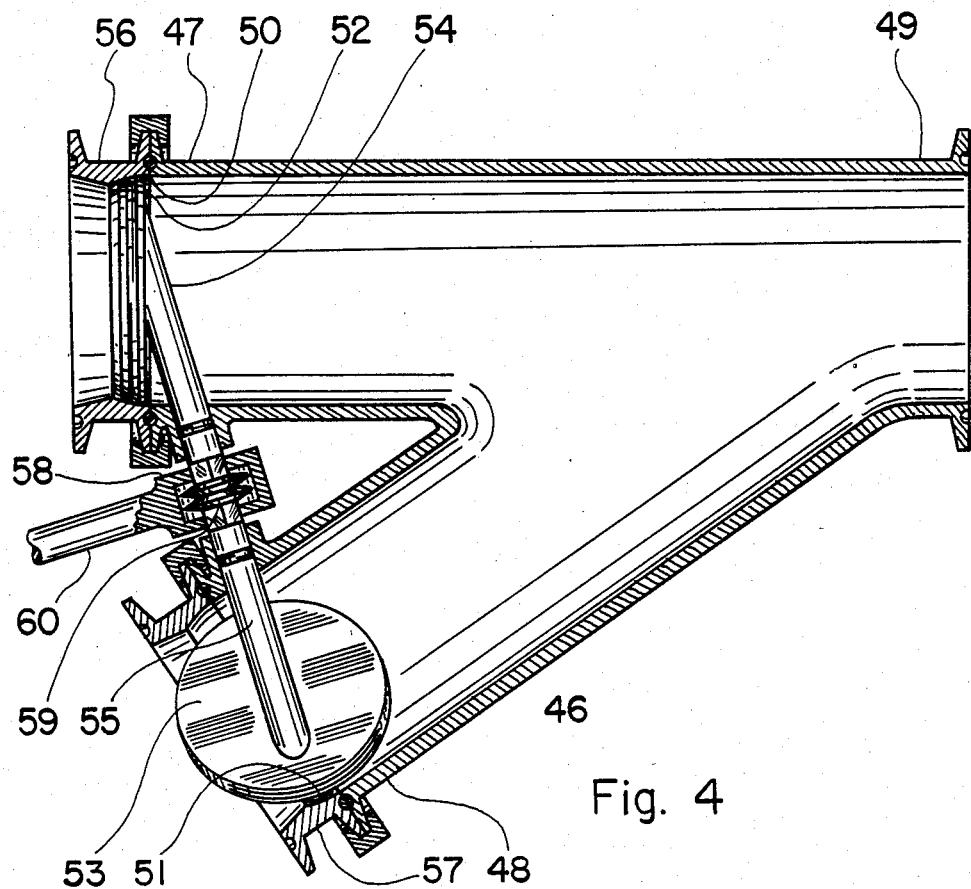
FIG. 4 illustrates a cross section of another divert valve constructed in accordance with the principles of the present invention.

In FIG. 1 there is shown a cross section of a floating disc divert valve constructed in accordance with the principles of the present invention, which cross section is taken along a plane including the central axis of the parent pipe and the central axis of two bifurcating pipes. The floating disc divert valve 1 comprises the first bifurcating pipe 2 with the connection means 5 disposed at the extremity, the second bifurcating pipe 3 with the connection means 6 disposed at the extremity and the parent pipe 4 with the connection means 7 disposed at the extremity. The first bifurcating pipe 2 includes a first annular seat 8 with the seating surface substantially conforming to the spherical surface of the first hypothetical sphere of diameter substantially equal to the inside diameter of the first bifurcating pipe and center substantially coinciding with the central axis of the first bifurcating pipe 2, which first annular seat 8 is disposed intermediate the extremity of the first bifurcating pipe and the center of said first hypothetical sphere. The first disc 9 having the rim surface 10 substantially conforming to the spherical surface of said first hypothetical sphere is rotatably disposed adjacent to the first annular seat 8 wherein the rim 10 includes a resilient ring type seal 11. It is emphasized that the center of the first hypothetical sphere is located a small distance away from the face of the first disc 8 opposite to the extremity of the first bifurcating pipe 2. The first disc 9 is supported by the first stem 12 mechanically connected to the dorsal member 13 rigidly affixed to the face of the first disc 9 opposite to the extremity of the first bifurcating pipe, wherein the central axis of the first stem 12 substantially passes through the center of the first hypothetical sphere where it substantially intersects the central axis of the first bifurcating pipe 2 in an oblique angle and further intersects the face of the first disc 9 in another oblique angle. The first stem rotatably and slidably engages the hole 14 coaxially included in the first stem housing 15 extending from the wall of the first bifurcating pipe 2 in an oblique angle with respect to the central axis of the first bifurcating pipe and toward to the second bifurcating pipe 2, which first stem 12 extends through said hole 14 in a leak-proof manner as facilitated by the resilient ring type seal 16 disposed around said first stem 12. The second bifurcating pipe 3 includes the second annular seat 17 with the seating surface substantially conforming to the spherical surface of the second hypothetical sphere and the second disc 18 with the rim 19 matching to the seating surface of the second annular seat 17 including the resilient ring type seal 20, which combination of the second annular seat 17 and the second disc 18 is disposed in the second bifurcating pipe 3 near the extremity in the same arrangement as the corresponding parts included in the first bifurcating pipe 2. The second stem 21 mechanically connected to the dorsal member 22 rigidly affixed to the face of the second disc 18 opposite to the extremity of the second bifurcating pipe 3, rotatably and slidably engages the hole 23 coaxially included in the second stem housing 24 extending from the wall of the second bifurcating pipe 3 in an oblique angle with respect to the central axis of the second bifurcating pipe and extends through the hole 23 toward to the first bifurcating pipe in the coaxial relationship with the first stem and in a leak-proof manner as facilitated by the resilient ring type seal 25. The central axis of the second stem 21 substantially passes through the center of the second hypothetical sphere where it substantially intersects the central axis of the second bifurcating pipe 2 in an oblique angle and further intersects the face of the second disc 18 in another oblique angle. As the center lines of the holes 14 and 23 respectively included in the stem housings 15 and 24 are lined up to one another, the outer extremities 26 and 27 of the stems 12 and 21 are disposed adjacent to one another and coupled to one another by a coupling means 28 to which the handle or other means for rotating the valve stems in unison is attached. It should be understood that a common oblique angle between the central axis and the face of the disc must be employed for both discs 9 and 18 included in the floating disc divert valve 1 and that the angle between the face of the first disc 9 and the face of the second disc 18 has to be equal to the angle of rotation of the stem required to rotate the disc from the fully closed position to the fully open position and vice versa, which angle of rotation is equal to the inverse cosine of the minus of the square of the tangent of the oblique angle between the central axis of the stem and the face of the disc. For example, said angle of rotation of the stem is equal to 94 degrees for the oblique angle of 15 degrees, 110 degrees for 30 degree oblique angle and 180 degrees for 45 degree oblique angle. It is also useful to notice that the bifurcating angle between the central axis of two bifurcating pipes is equal to twice of the oblique angle between the stem and the disc. It is interesting to notice that the handle of a divert valve of the bifurcating angle equal to 30 degrees need be rotated over only 94 degrees between two operating limits, while the handle of the divert valve of the bifurcating angle of 60 degrees has to be rotated in the range of 110 degrees. It is not difficult to devise a coupling means such as the coupling 28 connecting two outer extremities 26 and 27 of the stems 12 and 21 to one another, to which the handle or other rotating means can be connected to operate the divert valve 1 in such a way that one disc blocks off one bifurcating pipe when the other disc is rotated to fully open the other bifurcating pipe and vice versa, which operation diverts the flow entering the parent pipe 4 to either the first bifurcating pipe 2 or the second bifurcating pipe 3. It should be understood that the coupling connecting the two extremities of the first and second stems 12 and 21 should be designed to operate successfully even when a small amount of the axial and angular misalignment exists between two stems 12 and 21; whereby, the tolerance in the mating between the valve seat and the disc in one disc valve included in the divert valve of the present invention can be controlled without influencing and without being influenced by the other disc valve included in the same divert valve, which is the primary object of the present invention that enables the manufacturing and operation of the the divert valve with one hundred percent shut-off capability easy and trouble-free. Achieving one hundred percent shut-off with the Galloway's invention (U.S. Pat. No. 4,295,491) is a difficult and expensive task because of the lack of rigidity in the long cantilever stem supporting two discs employed in said invention and because of the requirement that the tolerance in the mating between the valve seat and disc has to be simultaneously controlled for both valve seats and both discs included in Galloway's invention. It should be mentioned that the particular arrangement employing 30 degree bifurcating angle as shown in FIG. 1 is only an illustrative embodiment for constructing the divert valves of the present invention. For example, essentially the same arrangement as shown in FIG. 1 can be incorporated to the divert valve of 60 degree bifurcating angle as shown in FIG. 4 or of many other bifurcating angles as large as 90 degrees and as small as a few degrees. The connecting means assembly 29 is included to the floating disc divert valve 1 in order to facilitate the assembly and disassembly of said divert valve wherein, once the coupling means such as 28 connecting two stems to one another is removed and the connecting means assembly 29 is disconnected, each of two stems 12 and 21 can be pulled out completely from the respective bifurcating pipes whereupon the discs fall out of the respective bifurcating pipes, which mechanism will be further explained when the sliding connection means between the disc and the stem is described in conjunction with FIG. 2. The special purpose coupling 28 includes a pair of the elliptical cam grooves 30 engaged by the pair of the cam rollers 31 and 32 radially extending from the extremities of the valve stems 12 and 21, each of which elliptical cam grooves is disposed on each of two diametrically opposite side of two stems 12 and 21. The rotation of the handles rigidly connected to the special purpose coupling 28 about the axis parallel to the central axis of the elliptical cam grooves pushes into or pulls out both stems 12 and 21 over a small distance, which axial movement of the stems 12 and 21 establishes the seating pressure between the valve seat and the disc for a leak-proof shut-off or relieves the seating pressure for a frictionless rotation of the discs in the opening and closing of the valve, which mechanism will be further described in conjunction of FIG. 2. Of course, the rotation of the stems 12 and 21 about their common central axis by the handle rigidly connected to the coupling means 28 opens and closes the discs 9 and 18 included in the floating disc divert valve 1.

In FIG. 2 there is shown a cross section of the disc connected to the stem in a sliding relationship as said elements are incorporated in the floating disc divert valve 1 of FIG. 1, which cross section is taken along a plane 2—2 as shown in FIG. 1. The dorsal member 22 includes a groove 33 with a narrowed down opening 34 slidably engaged by the inner extremity 35 of the stem 21 wherein the tapered end of the stem 21 is in contact with the bottom of the groove 33 while the pair of the flanges included in the narrowed down opening 34 of the groove 33 slidably engage the pair of the grooves 36 and 37 disposed on two opposite cylindrical sides of the stem 21, which pair of the grooves 36 and 37 are disposed parallel to the tapered end of the stem 21. With said mechanical means slidably connecting the disc and the stem to one another, the only possible movement between the disc and the stem is the sliding movement in the direction parallel to the face of the disc on a plane including the central axis of the stem, while any rotational movement therebetween about all axes is prohibited. Now, it is easily recognized that a small axial movement of the stems included in the floating disc divert valve 1 of FIG. 1 into respective valve bodies pushes the discs onto respective annular seats, while another small amount of the axial movement of the stems out of respective valve bodies pulls away the discs from respective annular seats. Therefore, a rotation of the elliptical cam groove 30 in one direction that pushes two stems 12 and 21 away from one another over a small distance establishes the seating pressure between the disc and the annular seat, while another rotation of said elliptical cam groove in the other direction that pulls two stems toward to one another over a small distance relieves the seating pressure. The special purpose coupling 28 included in the floating disc divert valve 1 of FIG. 1 is employed to provide a means for establishing the seating pressure between the discs and the annular seats for a leak-proof shut-off after rotating the discs to the first diverting position and for relieving the seating pressure before rotating the discs to the other diverting position. It should be clearly understood that the floating disc divert valve 1 functions equally well with another type of the coupling of a simpler design employed in place of the special purpose coupling 28 in connecting the stems 12 and 21 to one another.

In FIG. 3 there is illustrated another embodiment for coupling two stems included in a floating disc divert valve such as that of FIG. 1. The outer extremities 38 and 39 of two stems 40 and 41 supporting the pair of the discs in the sliding relationship as arranged in FIG. 1 are spring biased by a plurality of the washer springs 42 that exerts the spring force pushing two stems 40 and 41 away from one another and, consequently, said spring bias establishes a constant seating pressure between the discs and the annular seats. The washer springs 42 are housed in the cylindrical cavity 44 included in the coupling 43 nonrotatably and slidably connecting two stems 40 and 41 to one another. The handle 45 rigidly attached to the coupling and extending radially therefrom is used to rotate the stems 40 and 41 about their common central axis in switching the diverting of the flow from one bifurcating pipe to the other bifurcating pipe. Of course, the coupling 43 may be mechanically connected to an automatic actuator for the automatic operation of the floating disc divert valve.

In FIG. 4 thee is illustrated a cross section of a self-adapting disc divert valve 46 constructed in accordance with the principles of the present invention, which cross section is taken along a plane including all three central axes of the first bifurcating pipe 47, the second bifurcating pipe 48 and the parent pipe 49. The self-adapting disc divert valve 46 including the pair of the annular seats 50 and 51, the pair of the discs 52 and 53 and the pair of the stems 54 and 55 are constructed essentially in the same way as the floating disc divert valve 1 of FIG. 1 with the following exceptions: Firstly, the discs 52 and 53 are rigidly connected to the stems 54 and 55, respectively. Secondly, the annular seats 50 and 51 are included in the pair of the ferrules 56 and 57, respectively, which ferrules are removably connected to the extremities of the first and second bifurcating pipes 47 and 48, respectively. Once said ferrules are disconnected from the extremities of the bifurcating pipes, the disc-stem combinations can be pulled out of the valve body completely and, consequently, there is no need of a connecting means assembly corresponding to the element 28 included in the floating disc divert valve 1 of FIG. 1. The simple coupling 58 including the washer springs 59 to which coupling the actuating means 60 is attached, is employed to couple the stems 54 and 55 in a nonrotating and sliding relationship. The function of said coupling 58 is the same as that described in conjunction with FIG. 3.

Figure 5:
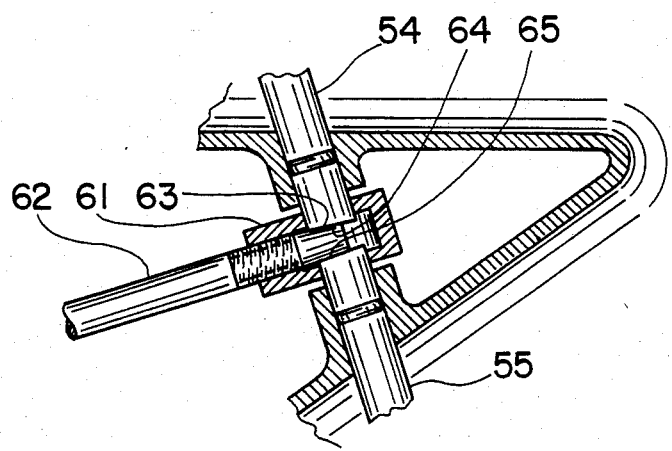
FIG. 5 illustrates a means included in the coupling connecting two valve stems included in a divert valve of the present invention for locking the discs to the respective valve seats to obtain one hundred percent shut-off.

In FIG. 5 there is shown another coupling 61 that may be employed in coupling two stems included in either the floating disc divert valve 1 of FIG. 1 or the self-adapting disc divert valve 46 of FIG. 4. The coupling 61 that nonrotatably and slidably coupling the stems 54 and 55 to one another includes the handle 62 threadedly connected to said coupling 61, which handle 62 has the tapered extremity 63 engaging the gap between two ends 64 an 65 of the stems 54 and 55. The rotation of the handle 62 about its own central axis in one direction pushes away two stems 54 and 55 from one another over a small distance and establishes the seating pressure to completely block off one of the bifurcating pipes, while another rotation of the handle 62 about its own central axis in the other direction relieves the seating pressure for an easy rotation of the discs. It should be understood that the resilient ring type seal installed around the rim of the disc may be included in the annular seat instead of the rim of the disc in constructing the self-adapting disc divert valve. It should be further understood that the annular seat included in the self-adapting disc divert valve may have the spherical seat or a conical seat or a straight cylindrical seat.

While the principles of the present invention have now been made clear by the illustrative embodiments, there will be immediately obvious to the skilled in the art many modifications of the structure, arrangement, proportion, elements and material which are particularly adapted to the specific working environment and the operating condition without departing from the principles of the present invention.

We claim:
1. A floating disc divert valve comprising in combination:
   (a) a parent pipe;
   (b) a first pipe bifurcating from said parent pipe;
   (c) a second pipe bifurcating from said parent pipe;
   (d) a first annular seat included in said first pipe near one extremity having a connection means for connecting to a pipe line, said first annular seat having a seating surface substantially conforming to a spherial surface of a first hypothetical sphere of diameter slightly larger than an inside diameter of said first pipe and of center substantially coinciding with a central axis of said first pipe wherein said first annular seat is disposed intermediate said center of said first hypothetical sphere and said one extremity of said first pipe;
   (e) a first disc with a rim surface substantially conforming to the spherical surface of said first hypothetical sphere rotatably disposed in said first pipe adjacent to said first annular seat;
   (f) a first stem nonrotatably and slidably connected to said first disc, said first stem rotatably and slidably engaging and extending through a hole included in a first stem housing extending toward to said second pipe, a central axis of said first stem substan- tially passing through the center of said first hypothetical sphere wherein it substantially intersects the central axis of said first pipe in an oblique angle and further intersects a face of said first disc in another oblique angle, wherein the only possible movement of said first stem relative to said first disc is a sliding movement in a direction parallel to a face of said first disc on a plane including the central axis of said first stem;

(g) a second annular seat included in said second pipe near one extremity having a connection means for connecting to another pipe line, said second annular seat having a seating surface substantially conforming to a spherical surface of a second hypothetical sphere of diameter slightly larger than an inside diameter of said second pipe and of center substantially coinciding with a central axis of said second pipe wherein said second annular seat is disposed intermediate said center of said second hypothetical sphere and said one extremity of said second pipe;

(h) a second disc with a rim surface substantially conforming to the spherical surface of said second hypothetical sphere rotatably disposed in said second pipe adjacent to said second annular seat;

(i) a second stem nonrotatably and slidably connected to said second disc, said second stem rotatably and slidably engaging and extending through a hole included in a second stem housing extending toward to said first pipe in a coaxial relationship with respect to said first stem, a central axis of said second stem substantially passing through the center of said second hypothetical sphere wherein it substantially intersects the central axis of said second pipe in an oblique angle and further intersects a face of said second disc in another oblique angle, wherein the only possible movement of said second stem relative to said second disc is a sliding movement in a direction parallel to a face of said second disc on a plane including the central axis of said second stem;

(j) coupling means nonrotatably and slidably coupling said first and second stems to one another; and (k) rotating means for rotating said first and second stems about the common central axis of said first and second stem, said means including means for pulling and pushing said first and second stems toward to and away from one another over a small distance; whereby, a seating pressure between said discs and said annular seats can be established for a leak-proof closure or relieved for an easy rotation of said discs.

* * * * *